(12) United States Patent
Jain et al.

(10) Patent No.: US 9,710,626 B2
(45) Date of Patent: Jul. 18, 2017

(54) SECURITY MODEL FOR NETWORK INFORMATION SERVICE

(75) Inventors: Bhushan P. Jain, Jalgaon (IN); Sandeep R. Patil, Pune (IN); Sri Ramanathan, Lutz, FL (US); Gandhi Sivakumar, Victoria (AU); Matthew B. Trevathan, Kennesaw, GA (US); Wijayaratnam Wijayakumaran, Killara (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/543,628

(22) Filed: Jul. 6, 2012

(65) Prior Publication Data
US 2014/0013423 A1    Jan. 9, 2014

(51) Int. Cl.
*G06F 21/62* (2013.01)
*G06F 21/31* (2013.01)

(52) U.S. Cl.
CPC ................. *G06F 21/31* (2013.01)

(58) Field of Classification Search
CPC .......... H04L 63/10; H04L 63/08; G06F 21/44
See application file for complete search history.

(56) References Cited

U.S. PATENT DOCUMENTS

| | | | |
|---|---|---|---|
| 6,510,522 B1 | 1/2003 | Heinrich et al. | |
| 7,592,859 B2 | 9/2009 | Hastings | |
| 7,730,523 B1 | 6/2010 | Masurkar | |
| 7,752,407 B1 | 7/2010 | Langhammer et al. | |
| 7,895,447 B2 | 2/2011 | Dellow et al. | |
| 8,112,615 B1 * | 2/2012 | Beard | 712/41 |
| 8,180,986 B2 | 5/2012 | Harris et al. | |
| 8,185,709 B2 | 5/2012 | Kim | |
| 8,196,175 B2 | 6/2012 | Reed et al. | |
| 8,261,091 B2 | 9/2012 | Barck et al. | |
| 8,271,536 B2 | 9/2012 | Amradkar et al. | |
| 8,296,321 B2 | 10/2012 | Durdik et al. | |
| 8,336,089 B1 | 12/2012 | Ahmed et al. | |
| 8,353,012 B2 | 1/2013 | Del Real | |
| 8,356,361 B2 | 1/2013 | Werner et al. | |

(Continued)

OTHER PUBLICATIONS

Buecker, A. et al., "Cloud Security Guidance", IBM Redpaper; 2009; 22 pages.

(Continued)

*Primary Examiner* — Izunna Okeke
(74) *Attorney, Agent, or Firm* — Christopher K. McLane; Andrew M. Calderon; Roberts Mlotkowski Safran Cole & Calderon, P.C.

(57) ABSTRACT

Systems and methods for providing information security in a network environment are disclosed. The method includes initiating processing, invoked by a user, of at least one of a plurality of objects in a processing unit of a hardware layer, wherein the plurality of objects is hosted for a tenant. The method further includes determining that the processing of the at least one of the plurality of objects by the processing unit is authorized by the tenant based on a security map provided by the tenant and accessible by the processing unit within the hardware layer. The method further includes allowing the processing of the object based on a result of the determining.

19 Claims, 7 Drawing Sheets

500

| OBJECT ID 507 | USER ID 508 | USER PASSCODE 509 | TENANT SECURITY CODE 510 | TENANT ID 511 | AUTHENTICATOR ID 512 | SERVICE IMPLEMENTATION ID 513 | LOCATION ID 514 |
|---|---|---|---|---|---|---|---|
| 497A | User 445 | XXXX | YYYY | A | Worker 440A | Fetch | US |
| . | . | | . | . | . | . | . |
| . | . | | . | . | . | . | . |
| . | . | | . | . | . | . | . |

(56) References Cited

U.S. PATENT DOCUMENTS

| | | |
|---|---|---|
| 8,359,633 B2 | 1/2013 | Kubota |
| 8,438,621 B2 | 5/2013 | Zhang et al. |
| 8,473,469 B1 | 6/2013 | Yancey et al. |
| 8,566,612 B2 | 10/2013 | Davis et al. |
| 2002/0042924 A1 | 4/2002 | Adams |
| 2003/0126453 A1 | 7/2003 | Glew et al. |
| 2008/0115108 A1 | 5/2008 | Gunji |
| 2008/0148343 A1 | 6/2008 | Taniguchi |
| 2009/0249019 A1 | 10/2009 | Wu et al. |
| 2009/0249465 A1 | 10/2009 | Touboul |
| 2010/0017415 A1 | 1/2010 | Kurumai et al. |
| 2010/0122088 A1 | 5/2010 | Oxford |
| 2010/0125612 A1* | 5/2010 | Amradkar et al. ........... 707/802 |
| 2010/0174848 A1 | 7/2010 | Hana et al. |
| 2010/0235647 A1 | 9/2010 | Buer |
| 2010/0281273 A1 | 11/2010 | Lee et al. |
| 2011/0022642 A1 | 1/2011 | Demilo et al. |
| 2011/0023111 A1 | 1/2011 | Gunadisastra et al. |
| 2011/0099384 A1* | 4/2011 | Grange ............... H04L 9/0897 713/184 |
| 2011/0119307 A1 | 5/2011 | Unger et al. |
| 2011/0131275 A1 | 6/2011 | Maida-Smith et al. |
| 2011/0270886 A1 | 11/2011 | An et al. |
| 2011/0276914 A1 | 11/2011 | Ahlgren et al. |
| 2011/0302415 A1 | 12/2011 | Ahmad et al. |
| 2011/0307947 A1 | 12/2011 | Kariv et al. |
| 2012/0215918 A1 | 8/2012 | Vasters et al. |
| 2013/0097379 A1 | 4/2013 | Ide et al. |
| 2013/0275771 A1 | 10/2013 | Moran et al. |

OTHER PUBLICATIONS

"Method of Creating a Componentized Architecture for Unifying Resource Sharing Scenarios in Cloud Computing Environment", IBM; Feb. 11, 2010; downloaded from http://priorartdatabase.com/ IPCOM/000193146D, 13 pages.

Mell, Peter and Grange, Tim, "The NIST Definition of Cloud Computing", National Institute of Standards and Technology, Information Technology Laboratory, Version 15, Oct. 7, 2009.

Davenport, J.H., "Cryptography and Security in Clouds," IBM Forum Zurich, http://www.zurich.ibm.com/~cca/csc2011/program. html, Mar. 15-16, 2011, 35 pages.

Sadeghi et al., "Token-Based Cloud Computing," Trust'10 Proceedings of the 3rd Int'l Conf. on Trust and Trustworthy Computing, 2010, 13 pages.

Suh, G. Edward et al., "Physical Unclonable Functions for Device Authentication and Secret Key Generation", DAC 2007, Jun. 4-8, 2007, San Diego, CA, 6 pages.

Holcomb, Daniel E. et al., "Power-up SRAM State as an Identifying Fingerprint and Source of True Random Numbers", IEEE Transactions on Computers, vol. 57, No. 11, p. 1-14, Nov. 2008.

Office Action dated Nov. 26, 2013 in U.S. Appl. No. 13/550,830, 12 pages.

Li et al., "Multi-Tenancy Based Access Control in Cloud", IEEE, 2010; 4 Pages.

Final Office Action dated Jun. 26, 2014 in U.S. Appl. No. 13/550,830, 20 pages.

Notice of Allowance in related U.S. Appl. No. 13/550,830 dated Feb. 14, 2017, 9 pages.

* cited by examiner

SECURITY MODEL FOR NETWORK INFORMATION SERVICE

FIELD OF THE INVENTION

The invention relates to systems that provide information security in a network environment, and methods therefor.

BACKGROUND

The emerging cloud computing paradigm uses concepts including automation, virtualization, and consolidation to provide software-as-a-service (SaaS), infrastructure-as-a-service (IaaS), and platform-as-a-service (PaaS), for example. Such services can have a multi-tenant based architecture in which the software, infrastructure, or platform is shared across multiple clients. While clients of these services may appreciate the benefits of SaaS, IaaS, and PaaS they may not trust that these services can protect sensitive or critical information from unauthorized access.

Accordingly, there exists a need in the art to overcome the deficiencies and limitations described hereinabove.

BRIEF SUMMARY

In an aspect of the invention, a method comprises initiating processing, invoked by a user, of at least one of a plurality of objects in a processing unit of a hardware layer, wherein the plurality of objects is hosted for a tenant. The method further comprises determining that the processing of the at least one of the plurality of objects by the processing unit is authorized by the tenant based on a security map provided by the tenant and accessible by the processing unit within the hardware layer. The method further comprises allowing the processing of the object based on a result of the determining.

In another aspect of the present invention, a system for providing an information service to a tenant comprises a security processor comprising an external communication interface and a computer-readable memory storing a security map of the tenant and accessible by the security processor. The security processor is configured to access the security map, match credentials of a user with the security map, and receives authorization by the tenant for access by the user.

In accordance with additional aspects of the present invention, a computer program product comprising a computer readable storage medium having readable program code embodied in the storage medium, the computer program product being operable to provide access to one or more objects stored within a library by receiving credentials, at a hardware layer, of an owner of the one or more objects.

In accordance with additional aspects of the present invention, a computer system comprises a CPU, a computer readable memory and a computer readable storage media. The system further comprises first program instructions to initiating processing of at least one of a plurality of objects in a processing unit of a hardware layer, wherein the plurality of objects is hosted for a tenant. The system further comprises second program instructions to determine that the processing of the at least one of the plurality of objects by the processing unit is authorized by the tenant based on a security map provided by the tenant and accessible by the processing unit within the hardware layer. The system further comprises second program instructions to halt the processing of the object. The first, second, and third program instructions are stored on the computer readable storage media for execution by the CPU via the computer readable memory.

In accordance with additional aspects of the present invention, a method of deploying a system for providing an information service to a tenant comprises providing a computer infrastructure including a security processor at a hardware layer of the computer infrastructure, the security processor being operable to halt processing of an object invoked by a user based a security map accessible by the security processor unit within the hardware layer, the security map being a data structure populated by a tenant.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

DETAILED DESCRIPTION

Figure 1:
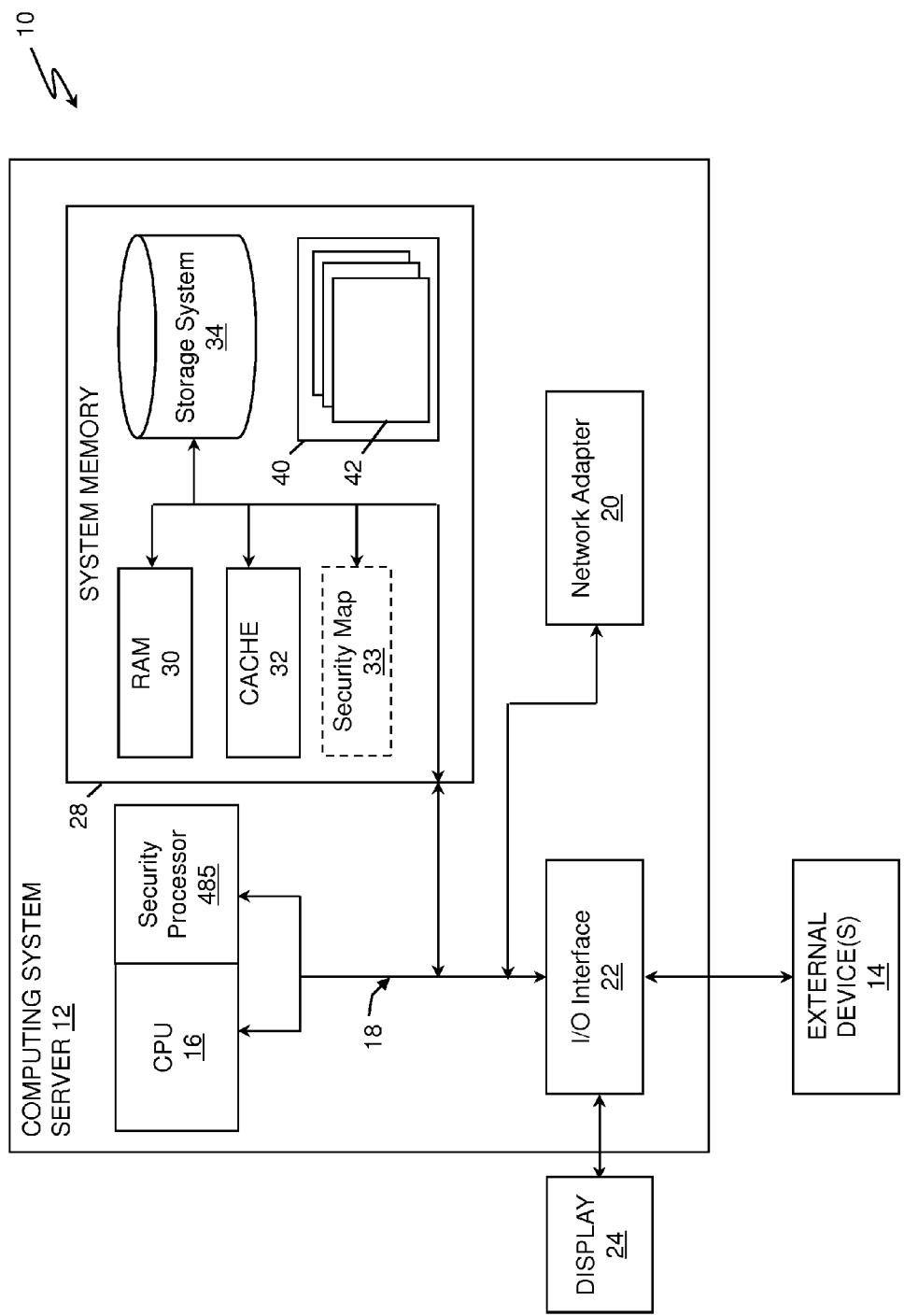
FIG. 1 shows a cloud computing node in accordance with aspects of the present invention.

The invention relates to systems that provide information security in a network environment, and methods thereof. According to aspects of the invention, a network information system provides services that maximize a tenant's (owner of information stored in a cloud environment) trust in the system's ability to keep information secure by allowing the tenant to control the use of their respective information. For example, a tenant of a multi-tenant IaaS can directly participate in security control mechanisms and processes that prevents other tenants or users from executing the program code of the tenant that is hosted on the computing infrastructure.

According to aspects of the invention, a security processor resides within a hardware layer of the network information system. When a user (i.e., a consumer) invokes an object that is hosted by the tenant of the network information system, the security processor can obtain authorization from the tenant. In embodiments, the authorization is a security code provided by the tenant to the security processor through an external interface in the hardware layer of the network information system. The security code can be a static or dynamic token (e.g., a one-time password). The tenant can provide the security code through manual and/or automatic mechanisms.

For example, after a user invokes a program object of a tenant, a compiler compiles a program object into machine language instructions for execution by the CPU. Once execution of the object starts, the security processor can request a security code from the tenant. The CPU will not complete execution of the instructions unless the security code received from the tenant matches a corresponding code recorded in an internal security map that was previously received from the tenant. Because this process allows the tenant to participate in the security process, a compliant and trustful relationship can be maintained between the tenant and the service which, in turn, results in more business for the service provider.

Although the exemplary processes described above receive a security code from the tenant after the CPU begins processing the object, embodiments of the security processor can notify the tenant before execution of the object starts, such as after an instance of the object is created in system memory. Alternatively or additionally, it is contemplated that the security processor can require a security code from the tenant on a periodic basis. Further, while the security code is described as a single item, the security code can be a series of codes and/or a dynamically varying code. Moreover, while the security code is described corresponding to an entire object, embodiments can use a number of security codes that correspond to parts (e.g., segments) of an object.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud user can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple users using a multi-tenant model, with different physical and virtual resources dynamically assigned and reassigned according to demand. There is a sense of location independence in that the user generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the user, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and user of the utilized service.

Service Models are as follows:

Software as a Service (SaaS): the capability provided to the user is to use the provider's applications running on a cloud infrastructure. The applications are accessible from various client devices through a thin client interface such as a web browser (e.g., web-based email). The user does not manage or control the underlying cloud infrastructure including network, servers, operating systems, storage, or even individual application capabilities, with the possible exception of limited user-specific application configuration settings.

Platform as a Service (PaaS): the capability provided to the user is to deploy onto the cloud infrastructure user-created or acquired applications created using programming languages and tools supported by the provider. The user does not manage or control the underlying cloud infrastructure including networks, servers, operating systems, or storage, but has control over the deployed applications and possibly application hosting environment configurations.

Infrastructure as a Service (IaaS): the capability provided to the user is to provision processing, storage, networks, and other fundamental computing resources where the user is able to deploy and run arbitrary software, which can include operating systems and applications. The user does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable user electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Further, in accordance with aspects of the invention, the computing system server 12 also includes a security processor 485.

In embodiments, the security processor 485 provides solutions to ensure security on an action of the CPU, e.g., fetch, decode, execute and output, through an on chip micro monitor by exposing an interface for programming. In embodiments, the security processor 485 includes security systems and processes at the chip level. In more specific embodiments, the security processor 485 will reside on the CPU, at the hardware layer. In embodiments, the security processor 485 will provide an interface where the tenant (owner of information) of a clouding computing system is able to feed a security code either through static or dynamic mechanisms. The security processor 485 preferably reside within the CPU and will perform the processes of the present invention when a consumer (user) invokes the service or the software hosted in the infrastructure and the class loader loads the object from the library.

By way of example, as those of ordinary skill in the art know, when a compiler compiles, and the execution starts, i.e., after the high level language gets translated into a finite set of machine languages, the CPU performs the following:

Fetch;
Decode;
Execute; and
Output.

However, a CPU (processing unit) with the inbuilt security systems and processes of the present invention (security processor 485) will behave in the following manner:

The security processor 485 will have an inbuilt security map which will have security codes periodically fed in by individuals (tenants) belonging to the owner's organization; and The security processor 485 will fail execution unless the individual users keys in the respective security codes at the time of execution and matching occurs by the tenant.

In more specific embodiments, the security processor 485 can be integrated with one time passcode (OTP) based gadgets like Rational Software Architecture secure ID. The security processor 485 can access a security map designed for parts of the code or globally, and can be assigned with dynamically varying passcodes for the complete steps of execution. Once the execution starts, the security processor 485 will notify the tenant, asking for security codes, and will complete execution only when complied. In embodiments, the design of the present invention can be made flexible to accept the machine language security code series even before the compilation starts. In embodiments, the CPU will not execute the instructions unless the series of security codes from the tenants are complied with the internal security map which, in turn, is controlled by the tenant.

In embodiments, the security processor 485 includes an interface which enables the tenant's top security programmer to gain access to the security map and specify the security code or other stronger credentials during initialization phase. Such credentials can be at various levels, for example, applied across the entire code or parts of the code. The security processor 485 will possess the intelligence to ignore cloud based security mapping when processing codes for traditional usage, in addition to providing cloud access from specific geography. For example, the security processor 485 will not allow the tenant's security programmer to access the information in certain geographic locations for the sake of compliance.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Further, in accordance with aspects of the invention, system memory 28 includes a security map 33. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention, including aspects of the security processor 485 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
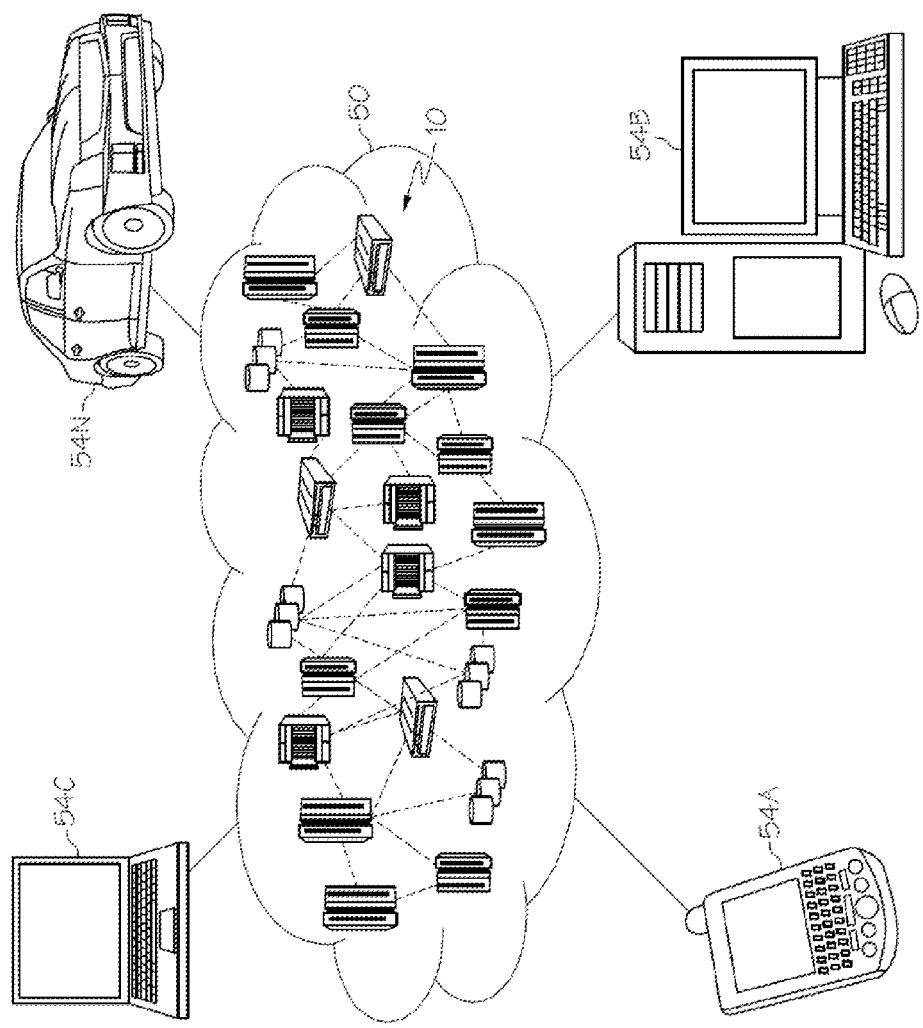
FIG. 2 shows a cloud computing environment in accordance with aspects of the present invention.

Referring now to FIG. 2, illustrative cloud computing environment 50 is depicted. As shown, cloud computing environment 50 comprises one or more cloud computing nodes 10 with which local computing devices used by cloud users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud user does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
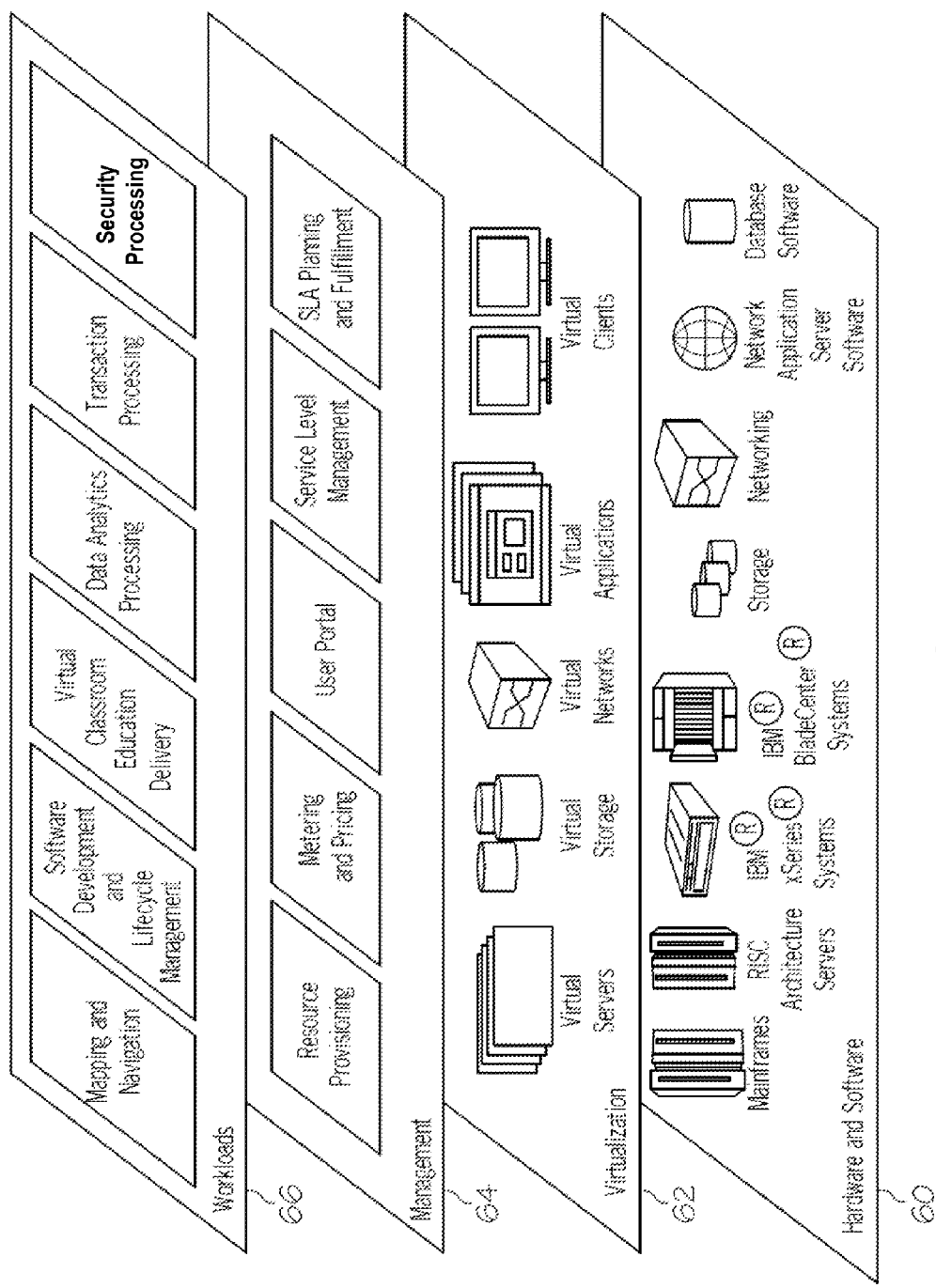
FIG. 3 shows abstraction model layers in accordance with aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud users and tasks, as well as protection for data and other resources. User portal provides access to the cloud computing environment for users and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security processing as described herein.

Figure 4:
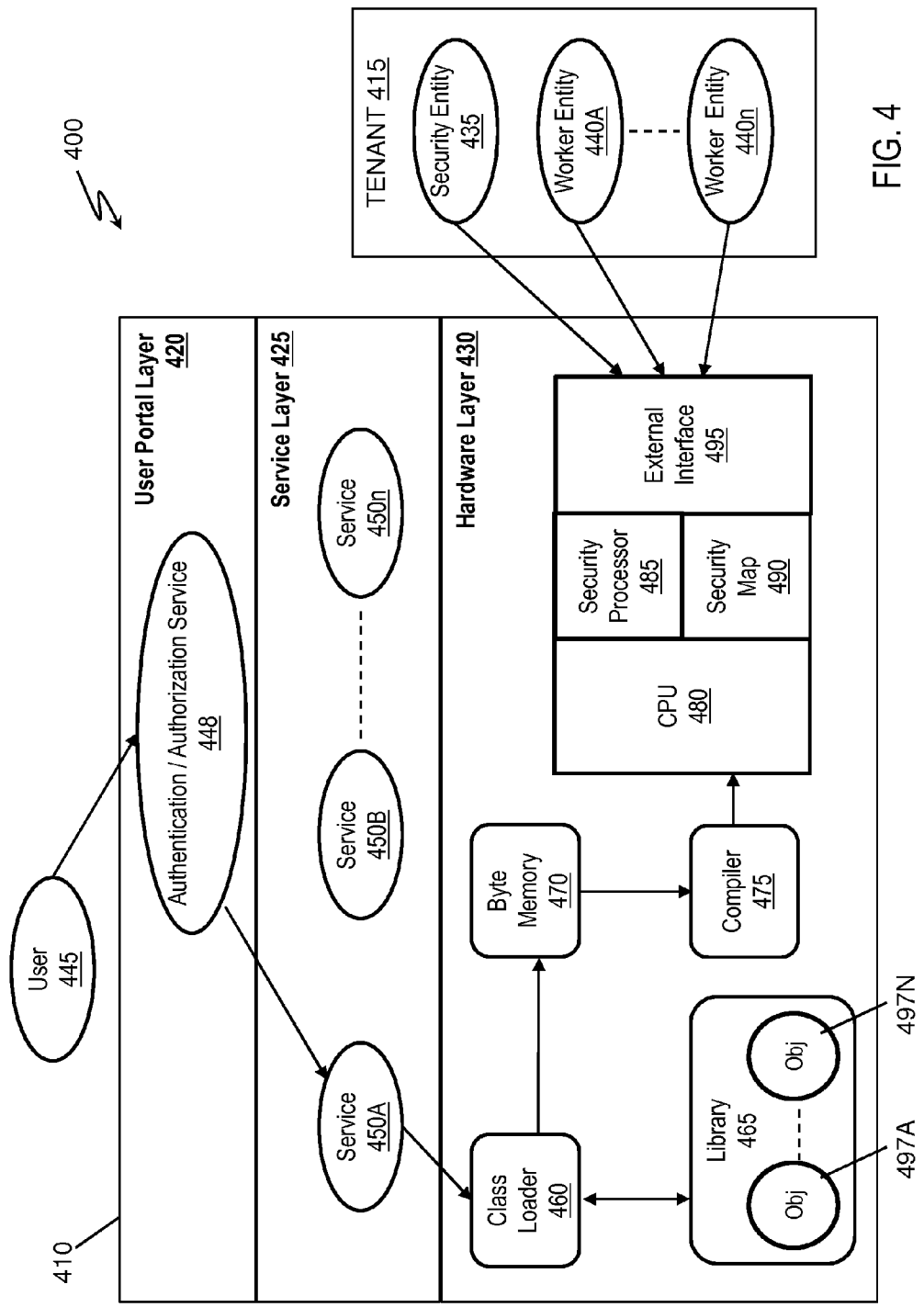
FIG. 4 shows an exemplary environment including a network information system in accordance with aspects of the present invention.

FIG. 4 illustrates a functional flow diagram of a network environment 400, in accordance with aspects of the invention. In embodiments, the network environment 400 includes a network information system 410 and a tenant 415, which is a client of services provided by the information system 410. The network information system 410 can, for example, provide a SaaS, PaaS, and/or an IaaS to the tenant 415 operated by a cloud service provider. As shown in FIG. 4, the network information system 410 can include a user portal layer 420, a service layer 425, and a hardware layer 430. In embodiments, these layers may be included in the above-described, Management layer 64, the Virtualization layer 62, and Hardware and Software layer 60, respectively, of FIG. 3. Although not shown in FIG. 4, the network information system 410 can include additional layers and functions, such as those discussed above with respect to FIG. 3.

The tenant 415 can be one of a number of tenants, which are clients of the network information system 410. In embodiments, the tenant 415 includes a security entity 435, and a plurality of worker entities 440A . . . 440n. The security entity 435 can be one or more users responsible for securing information of the tenant 415. For example, the security entity 435 may be a top security programmer or agent of the tenant 415. The worker entities 440A . . . 440n may be one or more people that generate and/or manage information through the network information system 410. For example, the worker entities 440A . . . 440n may be software programmers that write program objects using services hosted on the network information system 410.

Still referring to FIG. 4, a user 445 can access one or more of services 450A . . . 450n provided by the network information system 410 through the user portal layer 420. For example, the user 445 may be an individual (e.g., an employee or a customer) authorized by the tenant 415 to access its service 450A. In embodiments, the user 445 can access one or more of the services 450A . . . 450n, as controlled by a user authentication/authorization service 448 provided by the network information system 410. Authentication of the user 445 may be achieved using any of various conventional security methods, known to those of skill in the art. For example, the user 445 may provide credentials to the user portal 420 to gain access to services 450A . . . 450n provided by the network information system 410 for the tenant 415. In embodiments, the credentials can include a user identifier (ID) and/or a passcode. The passcode can be static or dynamic (e.g., a one-time password).

After successful authentication by the network information system 410, the user 445 can use the services 450A . . . 450n to invoke one of objects 497A . . . 497n stored in library 465 and controlled by the tenant 415 in the network information system 410. In embodiments, the objects 497A . . . 497n are program code created and/or managed by one or more of the worker entities 497A . . . 497n.

For example, in response to the user 445 invoking any of the objects 497A . . . 497n, the respective service 450A . . . 450n can cause a classloader 460 to invoke the object 497A stored in a library 465 that, in turn, can create an instance of the invoked object in a byte memory 470 of the hardware layer 430. A compiler 475 can then translate the instance from program code (e.g., C++ code) into machine language instructions for execution by a CPU 480. The CPU 480 can then access the machine language code in the byte memory 470 to begin an instruction cycle (i.e., fetch, decode, execute, output) in order to execute the object 497A.

In accordance with aspects of the invention, the instance of the object 497A . . . 497n includes information identifying the respective object 497A . . . 497n and/or the credentials of the user 445. In embodiments, the object identifier and the credential can be appended to the instance when the object 497A . . . 497n is instantiated, for example, as a preamble. Further, the instance of the object 497A . . . 497n can include other information, such as an identifier of the tenant 415 and/or an identifier of an authenticator (e.g., a worker entity 440). This information may be incorporated into the instance with the credential or at the time the object 497A . . . 497n was created and/or modified. Further, the instance of object 497A . . . 497n can include other information, such as the geographic position of the user 445.

It should be noted that to this point in the exemplary embodiments, information security has only been imposed on the user 445 in an upper layer of the system (i.e., the user portal). Further, the tenant 415 has had little participation in controlling the user's access to its service 450A outside of, perhaps, providing the user with credentials. Thus, from the tenant's point of view, access to the tenant's service is substantially out of its control. Consequently, the tenant 415 may have limited trust that its information is secure from unauthorized access and/or execution.

In accordance with aspects of the invention, the information service provider 410 enables the tenant 415 to participate in the information security at the hardware level of the network information system 410. More specifically, a security processor 485 resides in the hardware layer 430. In more specific embodiments, the security processor 485 is incorporated in the CPU 480. In embodiments, the security processor 485 can be in direct communication with the CPU 480, using any type of known communication channel. The invention, however, is not limited to these embodiments and it is contemplated that the security processor 485 can be located elsewhere in the hardware that executes the invoked object.

According to aspects of the invention, the security processor 485 is a programmable device configured to control execution of the objects 497A . . . 497n by the CPU 480 based on a security map 490 received from the tenant 415. In embodiments, the security map 490 can include information residing in memory which is addressable by the security processor 485 in order to associate one or more of the objects 497A . . . 497n with respective credentials. For example, in embodiments, the security processor 485 obtains security information from the security map 490. The mapped information can be matched to tenant supplied credentials or other security information (e.g. geographic information), for example, so that a user can gain access to the tenant information, in a secure manner. The mapped information can be, for example, fetch, decode, execute and output credentials. The security map 490 may be stored in memory of the security processor 485 and/or in the system memory (e.g., system memory 28).

For simplicity, the security map 490 assumes the credentials to be applied across the entire code; although, the credentials can also be extended for parts of the code. Also, the credentials can be made dynamic using other traditional mechanisms. In embodiments, the security map 490 can include the following information:

| | |
|---|---|
| Service implementation 1 (fetch) | Credential Username xxx, security code yyyy |
| Service implementation 1 (decode) | Credential Username xxx |
| Service implementation 1 (execute) | Credential Username xxx |

After authentication, the class loader can invoke the library and create instances in Byte memory. The compiler 475 compiles the high level language and is picked up by the CPU 480. The security processor 485 residing in the CPU 480 will notify the tenant participating programmers 435 to feed the security code or other credential to perform the execution. In this way, the tenants can ensure that their service or infrastructure is not being used unless notified and authenticated by them. Accordingly, the processes and systems of the present invention will enable a "tenant driven security model" enabling to gain the clients confidence in cloud based environments.

More specifically, in operation, as the CPU 480 begins and/or executes an instruction cycle to process an object (e.g., object 497A) invoked by the user 445, the security processor 485 compares machine language instructions of the object with information in the security map 490. For example, when the CPU 480 processes an instance of the object 497A . . . 497n invoked by user 445, the security processor 485 compares an identifier of the user in the object with the security map 490. If the user the user credentials are not included in the security map 490, the security processor 485 can cause CPU 480 to fail execution of the object 497A . . . 497n. In other words the security processor can prevent execution and/or halt further execution of the compiled instance of the object 497A . . . 497n.

An external interface 495 is a communication interface of the security processor 485 at the hardware layer 430. In embodiments, the external interface 495 can be a SOAP (Simple Object Access Protocol) interface, which is a protocol specification for exchanging structured information in the implementation of Web Services in computer networks. In embodiments, the SOAP interface relies on Extensible Markup Language (XML) for its message format, and usually relies on other Application Layer protocols, most notably Hypertext Transfer Protocol (HTTP) and Simple Mail Transfer Protocol (SMTP), for message negotiation and transmission. In embodiments, the external interface 495 enables the tenant 415 (e.g., the security entity 435 and/or the worker entities 440A . . . 440n) to communicate information (e.g., security maps, security codes and/or other credentials) to the security processor 485 and/or security map 490. In embodiments, the external interface 495 communicates with the tenant 415 through the hardware layer using file transfer protocol (i.e., FTP). Additionally or alternatively, the security processor 485 communicates with the tenant 415 via user interface executed, for example, in the service layer.

Figure 5:
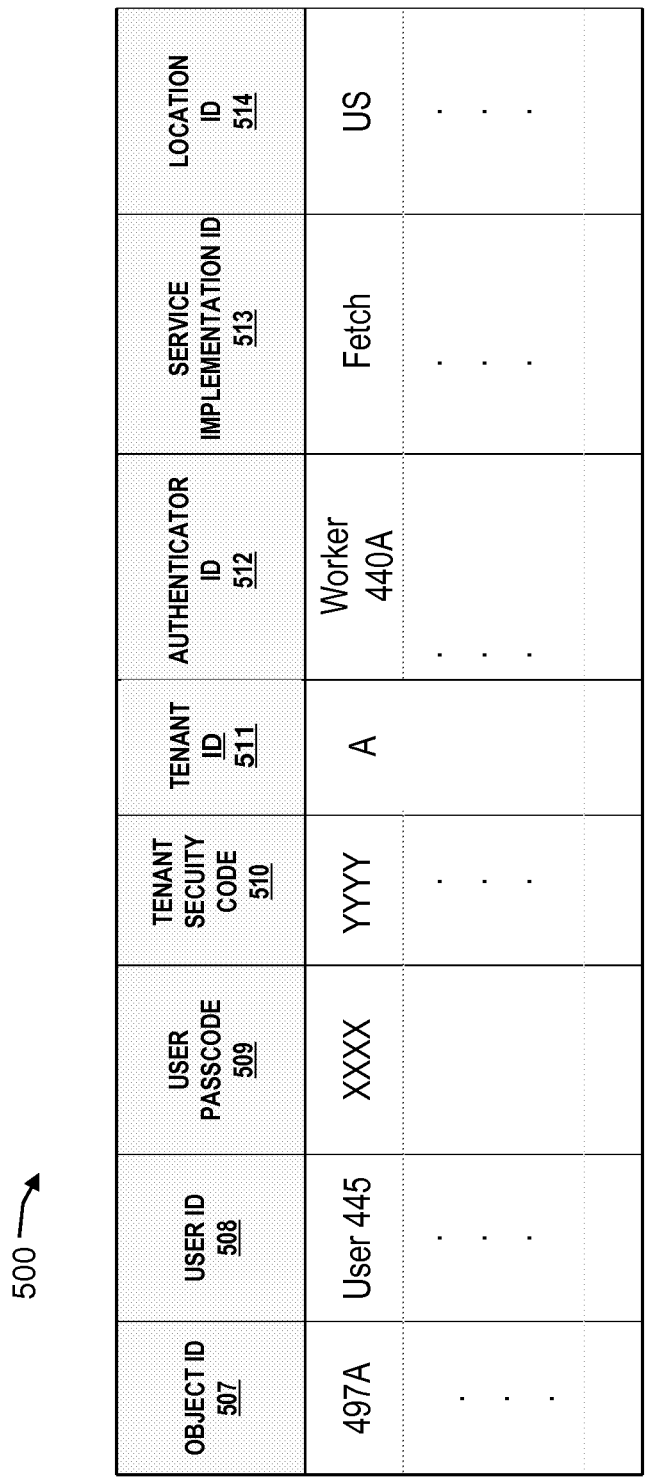
FIG. 5 shows an exemplary data structure for a security map in accordance with aspects of the present invention.

FIG. 5 shows an exemplary data structure for a security map 500 in accordance with aspects of the present invention. Specifically, in accordance with aspects of the present invention, the security map 500 is specific to a particular tenant (e.g., tenant 415). As such, in a multi-tenant environment, each tenant can be associated with a respective security map 500. In embodiments, the security map 500 can be stored in the system memory (e.g., system memory 28) of the network information service 410 or within the security processor (e.g., security processor 485).

The security map 500 can include some or all the following columns: object ID 507, user ID 508, user passcode 509, tenant security code 510, tenant ID 511, authenticator ID 512, service implementation identification 513, and/or location ID 514. Although the information in the data structure 500 is illustrated user alphanumeric characters, it is contemplated that the information can be stored other formats; for example, as machine code. Further, while the information in the data structure 500 is illustrated in separate columns, this information may be stored and/or combined into one or more values. For example, the object ID, the credential ID and the user ID can be concatenated into a single binary word. In specific embodiments, the object identification column 507 includes information identifying objects, such as object 497A . . . 497n. User ID column 508 can include information identifying one or more users (e.g., user 445, security entity 435, or worker entities 440A-N). User passcode column 509 may include the user passcode information. Tenant security code column 510 can include a security code specified by the respective tenant of the security map 500 (e.g., tenant 415). Tenant ID column 511 can include a identifier for the tenant, e.g., security entity 435. Authenticator ID column 512 includes information identifying an authenticator (e.g., security entity 435 or one of worker entities 440) responsible for verifying the security code. Service implementation identification column 513 includes information identifying a particular service implementation of the CPU 480 instruction cycle (e.g., fetch, decode, execute, output) in which authorization is required. Location ID column 514 includes information identifying geographic regions from which the object is permitted (or not permitted) to be invoked from (e.g., outside the U.S.).

Based on the information in the security map 500, a security processor can prompt a tenant for a security code required to process a particular object. For instance, if a user invokes object 497A, the security processor may reference the security map 500 to prompt worker entity 440A at tenant 415 for a particular security code. Based on the information in the security map 500, the security processor can determine whether to halt execution of an object. For example, the security processor may halt execution of an object if the credentials of the user that invoked the object are not included in columns 508 and 509 corresponding to the object. In addition, the security processor may halt execution of an object if the tenant identified in authenticator identified in column 512 fails to provide a security code matching that in column 510.

Figure 6:
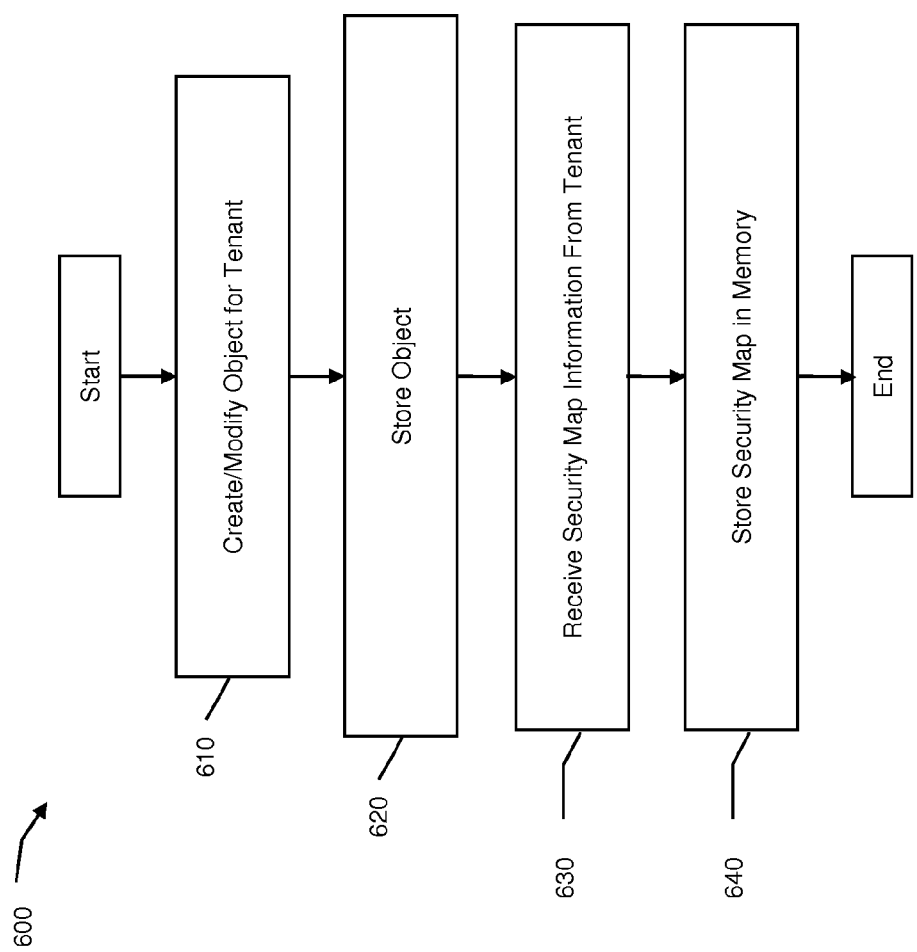
FIG. 6 shows a flow diagram of an exemplary process for providing a security map in accordance with aspects of the present invention.
Figure 7:
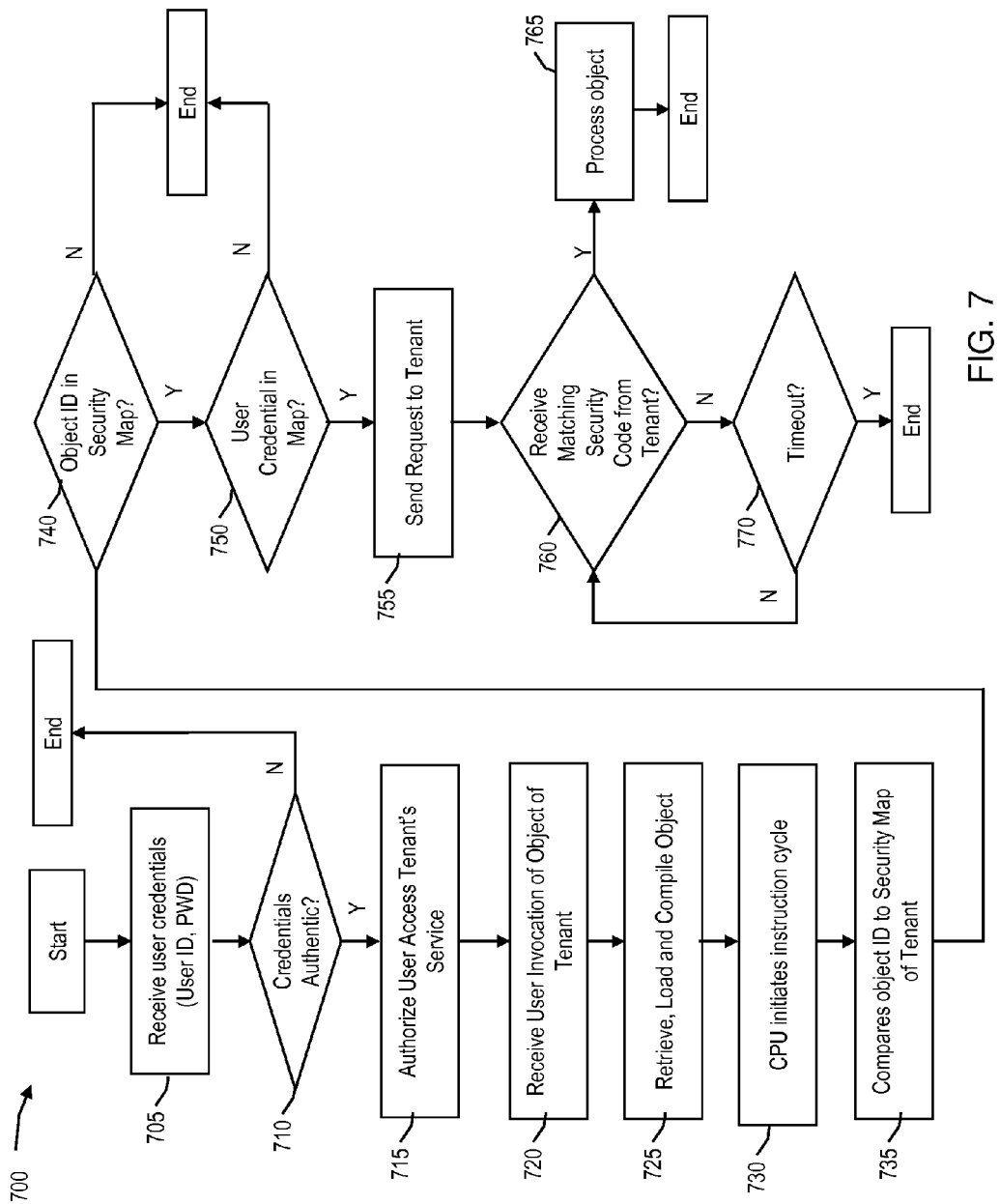
FIG. 7 shows a flow diagram of an exemplary process for authenticating execution of a tenant's information in accordance with aspects of the present invention.

FIGS. 6 and 7 show exemplary flows for performing aspects of the present invention. The steps of FIGS. 6 and 7 can be implemented in any of the environments of FIGS. 1-4. The flowcharts in FIGS. 6 and 7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 shows a flow diagram of an exemplary process for implementing a security map in a network information system in accordance with aspects of the present invention. According to aspects of the invention, each tenant (e.g., tenant 415) of a network information system (e.g., network information system 410) can provide, update and/or maintain a respective security map stored at the hardware level of the system. The security map allows the tenants to control execution of their respective information and, thereby, increase their trust in the services provided by a network information system.

More specifically, at step 610, a representative of the tenant (e.g., worker entity 440A of tenant 415) creates and/or modifies an object using the network information system. In embodiments, the representative of the tenant may be a software programmer or other such entity that creates or modifies program objects (e.g., object 497A) using an IaaS. At step 620, the network information system stores the object in the tenant's library (e.g. library 465). As discussed above, in embodiments, the stored object is stored along with information including an object ID, a tenant ID, and an authenticator ID, for example. Further, the object can be stored along with other information, such as geographic regions that are allowed or forbidden to invoke the object.

At step 630, the network information system receives security map information for the object provided from the tenant. For example, a top programmer (e.g., security entity 435) can provide or modify the tenant's security map to include information corresponding to the stored object. In embodiments, the security map information can be provided via an external interface (e.g., external interface 495) of the security processor (e.g., security processor 485). By enabling the security entity of the tenant to create, update and/or maintain the security map, the tenant is provided with greater trust with respect to the security of the tenant's information stored by the network information system. At step 640, the security map can be stored in memory.

FIG. 7 shows a flow diagram of an exemplary process for authorizing execution of an object hosted a network information system for a tenant in accordance with aspects of the present invention. According to aspects of the invention, the network information system (e.g., network information system 410) includes a security processor (e.g., security processor 485) that prevents a CPU (e.g., CPU 480) from processing an object (e.g., object 497A) based on a tenant-defined security map (e.g., security map 490), which is provided at a hardware layer (e.g., hardware layer 430). More specifically, at step 705, the network information system receives a user's (e.g., user 445) request to access a tenant's service. At step 710, the network information system determines whether the credentials (e.g., an ID and passcode) provided by the user are authentic. If the credentials are not authentic, the process ends; however, if the credentials are authentic, then at step 715, the network information system authorizes the user to access a service (e.g., service 450A) of a tenant (e.g., tenant 415) corresponding to the authenticated credentials. At step 720, the network information system receives the users invocation of an object (e.g., object 497A) of the tenant. At step 725, the network information system retrieves the object invoked by the user from a library of the tenant. For example, a classloader (e.g., classloader 460) obtains the invoked object from the library (e.g., 465) and loads an instance the object in a byte memory (e.g. byte memory 470). As describe above, the user's credential information may be incorporated (e.g., appended) to the instance. Using the instance in the byte memory, a compiler (e.g., compiler 475) translates the instance into machine code and passes such code to a CPU (e.g., CPU 480) for processing.

At step 730, the CPU begins the instruction cycle processing of the machine code translated from the instance. At step 735, the security processor (e.g., security processor 485) compares the user's credential and other information to the security map (e.g., security map 490) of the tenant. If, at step 740, it is determined that the object is not included in the security map, then the security processor halts execution.

If, at step 740, it is determined that the object is in the security map of the tenant, then at step 750, the security processor compares the user credentials in the object with one or more credentials of the user in the security map. If there is no match between the credentials in the instance and that in the security map, the security processor halts execution of the object by the CPU. At step 750, if there is a match between the user credentials and the security map, then at step 755, the security processor can send a request to the tenant for the security code of the object. In embodiments, the request is sent via an external interface (e.g., external interface 495) of the security processor. At step 760, the security processor determines whether a security code received from the tenant matches that in the security map. If so, at step 765, the security processor allows the CPU to continue execution of the object. At step 770, if the tenant does not provide a correct security code before the end of a predetermined timeout period, the security processor halts execution of the object by the CPU.

As thus described in embodiments, the tenant can ensure that their service or infrastructure is not used unless notified and authenticated by the tenant, which thereby increases the tenant's confidence in cloud based environments. Although the process shown in FIG. 7 describes authenticating a single code for single object, it is understood that a single object may be associated with a series of codes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A method, comprising:
   initiating processing, invoked by a user having a dynamically varying credential, by a security processor comparing instructions of at least one of a plurality of objects in a processing unit of a hardware layer with information in a security map, wherein the plurality of objects is hosted by a tenant that provided the dynamically varying credential to the user;
   determining that the processing of the at least one of the plurality of objects by the processing unit is authorized by the tenant based on the security map provided by the tenant and accessible by the processing unit within the hardware layer; and
   allowing the processing of the object based on a result of the determining,
   wherein the determining comprises:
      determining that the security map includes an association between the at least one of the plurality of objects and a security code;
      sending a message to the tenant requesting the security code;
      comparing a response from the tenant with the security code in the security map; and
      determining that the security map includes an association between the object and a geographic region.

2. The method of claim 1, wherein the determining comprises determining that the at least one of the plurality of objects is identified in the security map.

3. The method of claim 1, wherein the determining comprises determining that the security map includes an association between the at least one of the plurality of objects and the credential of the user.

4. The method of claim 1, wherein the determining that the processing of the object by the CPU is authorized by the tenant is performed at more than one step of an instruction cycle.

5. The method of claim 1, wherein the initiating processing comprises initiating an instruction cycle by the processing unit comprising a fetch, a decode, and an execute.

6. The method of claim 1, wherein invoking the at least one of the plurality of objects includes compiling the object into machine language.

7. The method of claim 1, wherein the steps of claim 1 are at least one of created, maintained, deployed and supported by a service provider.

8. The method of claim 1, wherein steps of claim 1 are provided by a service provider on a subscription, advertising, and/or fee basis.

9. A system for providing an information service to a tenant comprising:
   a security processor comprising an external communication interface; and
   a computer-readable memory storing a security map of the tenant and accessible by the security processor,
   wherein the security processor is configured to:
      access the security map;
      match credentials of a user with the security map;
      receive authorization by the tenant for access by the user;
      ignore a cloud based security mapping when processing a security code of the tenant;
      determine that the security map includes an association between an object and the security code;
      send a message to the tenant requesting the security code via the external communication interface;
      compare a response received from the tenant with the security code in the security map; and
      determine whether the security map includes an association between an object and a geographic region.

10. The system of claim 9, wherein the security processor is configured to determine whether an object is identified in the security map.

11. The system of claim 9, wherein the security processor is configured to determine whether the security map includes an association between an object and a credential of the user.

12. The system of claim 9, wherein the security processor is configured to determine whether processing of an object by a CPU is authorized by the tenant at more than one step of an instruction cycle.

13. The system of claim 9, wherein the security processor and the computer-readable memory are located at a hardware layer.

14. The system of claim 9, further comprising:
a service layer comprising a plurality of services, wherein a first of the plurality of services is hosted for a first tenant of the plurality of tenants;
a hardware layer comprising:
a central processing unit (CPU);
the security processor having the external communication interface; and
the computer-readable memory addressable by the security processor;
wherein the external communication interface is configured to:
receive the security map from the tenant via the external communication interface, the security map associating an object of the tenant with a credential of the user; and
store the security map in the computer-readable memory.

15. The system of claim 14, wherein
the credentials of the user dynamically vary and are provided by the tenant, and
the security code dynamically varies and corresponds to a part of an object.

16. The system of claim 15, wherein the security processor is configured to:
determine whether a response received from the tenant via the external communication interface matches the security code in the security map; and
halt execution of an object by the CPU.

17. A computer program product comprising a computer readable storage medium having readable program code embodied in the storage medium, the computer program product being operable to:
provide access to one or more objects stored within a library by receiving dynamically varying security codes, at a hardware layer, of an owner of the one or more objects, each security code corresponding to a part of the one or more objects; and
determine that a processing of the one or more objects is authorized by the owner based on a security map provided by the owner,
wherein the determining comprises:
determining that the security map includes an association between the one or more objects and the security codes;
sending a message to the owner requesting the security codes;
comparing a response from the owner to the security codes in the security map; and
determining that the security map includes an association between the one or more objects and a geographic region.

18. A computer system comprising:
a CPU, a computer readable memory and a computer readable storage media;
first program instructions to provide a user with dynamically varying credentials for accessing a tenant service;
second program instructions to initiate processing of at least one of a plurality of objects in a processing unit of a hardware layer by executing at least one of the plurality of objects, wherein the plurality of objects is hosted by a tenant in the tenant service;
third program instructions to determine that the processing of the at least one of the plurality of objects by the processing unit is authorized by the tenant based on a security map provided by the tenant and accessible by the processing unit within the hardware layer; and
fourth program instructions to halt the processing of the one object,
wherein the first, second, third and fourth program instructions are stored on the computer readable storage media for execution by the CPU via the computer readable memory, and the determining comprises:
determining that the security map includes an association between the at least one of the plurality of objects and a security code;
sending a message to the tenant requesting the security code;
comparing a response from the tenant with the security code in the security map; and
determining that the security map includes an association between the object and a geographic region.

19. A method of deploying a system for providing an information service to a tenant, comprising:
providing a computer infrastructure including a security processor at a hardware layer of the computer infrastructure, the security processor being operable to:
halt processing of an object invoked by a user based a security map accessible by the security processor unit within the hardware layer and having an intelligence to ignore cloud based security mapping when processing a security code, the security map being a data structure populated by a tenant;
determine that the security map includes an association between the object and the security code;
send a message to the tenant requesting the security code via a communication interface of the security processor;
compare a response received from the tenant with the security code in the security map; and
determine that the security map includes an association between the object and the geographic region.

* * * * *